United States Patent
Zhu et al.

(10) Patent No.: US 12,024,599 B1
(45) Date of Patent: Jul. 2, 2024

(54) BIODEGRADABLE SELF-HEALING RUBBER ELASTOMER AND ITS PREPARATION METHOD AND APPLICATION

(71) Applicant: GUANGDONG UNIVERSITY OF TECHNOLOGY, Guangzhou (CN)

(72) Inventors: Dongyu Zhu, Guangzhou (CN); Xueqing Qiu, Guangzhou (CN); Xuliang Lin, Guangzhou (CN); Wenli Zhang, Guangzhou (CN); Yanlin Qin, Guangzhou (CN); Liheng Chen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 18/361,365

(22) Filed: Jul. 28, 2023

(30) Foreign Application Priority Data

Aug. 18, 2022 (CN) .......................... 202210994176.8

(51) Int. Cl.
*C08H 7/00* (2011.01)
*C08K 3/08* (2006.01)

(52) U.S. Cl.
CPC .................. *C08H 6/00* (2013.01); *C08K 3/08* (2013.01); *C08K 2003/0893* (2013.01)

(58) Field of Classification Search
None
See application file for complete search history.

(56) References Cited

FOREIGN PATENT DOCUMENTS

| | | | | |
|---|---|---|---|---|
| CN | 108484923 A | * | 9/2018 | ........... C08G 83/008 |
| CN | 109401336 A | * | 3/2019 | ................ C08J 5/18 |
| CN | 111423594 A | | 7/2020 | |
| CN | 111892716 A | | 11/2020 | |
| CN | 113061263 A | * | 7/2021 | |
| CN | 113754851 A | | 12/2021 | |
| JP | 2016060749 A | | 4/2016 | |

OTHER PUBLICATIONS

CN-108484923-A, Sep. 2018, Machine translation (Year: 2018).*
CN-109401336-A, Mar. 2019, Machine translation (Year: 2019).*
CN-113061263-A, Jul. 2021, Machine translation (Year: 2021).*
Chao Dang et al., "Facile solvent-free synthesis of multifunctional and recyclable ionic conductive elastomers from small biomass molecules for green wearable electronics", J. Mater. Chem. A, vol. 9, pp. 13115-13124.

* cited by examiner

*Primary Examiner* — Satya B Sastri

(57) ABSTRACT

Provided are a biodegradable self-healing rubber elastomer and its preparation method, which belongs to the field of elastomeric materials. The biodegradable self-repairing rubber elastomer is prepared by a melting method in which enzymatic lignin and itaconic acid are added to lipoic acid separately, melted and blended separately, and then cooled to obtain the rubber elastomer.

7 Claims, 5 Drawing Sheets

BIODEGRADABLE SELF-HEALING RUBBER ELASTOMER AND ITS PREPARATION METHOD AND APPLICATION

CROSS REFERENCE

The present disclosure claims priority of Chinese Patent Application No. 202210994176.8, filed on Aug. 18, 2022, the entire contents of which are hereby incorporated by reference in their entirety.

TECHNICAL FIELD

The present disclosure relates to the field of rubber elastomer materials, and more specifically, to a biodegradable self-healing rubber elastomer and its preparation method and application.

BACKGROUND

Rubber is closely related to human life and production and has a significant role in the development of modern human society. Despite the excellent overall performance of rubber products, there are many problems, such as rubber materials are easily worn out in daily use, resulting in a much shorter service life. In addition, the most widely used natural rubber raw materials are planted in areas limited to the Tropic of Cancer, with limited production and aging problems, as well as high energy consumption and high pollution in the production and processing of rubber materials, and waste rubber products are difficult to recycle and cannot be decomposed naturally, thus causing serious "black pollution" problems, making the application of rubber materials greatly restricted. Therefore, the development of biodegradable rubber elastomers is a good strategy to solve the above problems.

At present, biodegradable polyurethane elastomers are more researched, but they still have the following problems: the preparation process involves toxic and irritating isocyanate compounds; the preparation process is complicated; the material performance is single; and the problems of material loss and shortened life cannot be solved. Many research groups have worked on the introduction of self-healing function in polyurethane, which has solved the above problems of easy wear and tear and short life span of rubber materials to some extent. By introducing reversible non-covalent and dynamic covalent bonds (including imine bonds, disulfide bonds, hydrazone bonds, borate ester bonds, hydrogen bonds, ligand bonds, host-guest interactions and hydrophobic interactions, etc.) into the material to repair repeated mechanical damage, the material is able to continuously sense and respond to damage and repair throughout its life cycle. However, there are still a series of challenging issues in imparting self-healing properties to materials, such as high self-healing rates are often accompanied by weak mechanical properties due to the introduction of reversible non-covalent bonds; and the synthesis of many self-healing materials generally uses toxic solvents, which are highly polluting to the environment, and synthesis process is complicated.

Lipoic acid (TA) is a natural short-chain fatty acid containing carboxyl and disulfide bonds synthesized by plants, animals and humans themselves, which is biodegradable. At a melting temperature of 70° C., lipoic acid can be used to prepare supramolecular polymers by ring-opening polymerization reactions and has excellent self-healing properties without the addition of additional solvents. However, its use is greatly limited by the fact that the disulfide radical at the active end leads to its reverse closed-loop depolymerization and the low tensile strength of polylipoic acid itself. At present, lignin is often used in materials as an abundant green polymer organic substance, hoping to improve the mechanical properties and degradability of materials through its aromatic ring rigid structure and various reactive functional groups, but it is still mostly used in petroleum-based composites, and the problems of pollution and non-renewability have not been effectively solved. Therefore, it is important to develop more environmentally friendly, degradable, and high-performance rubber elastomers.

SUMMARY OF THE DISCLOSURE

The present disclosure provides a biodegradable self-healing rubber elastomer with green and safe raw materials, simple preparation, and anti-aging function to overcome the problems of chemical pollution, complex synthesis, and single function in the preparation process of existing biodegradable elastomer.

The technical problem to be solved by the present disclosure is achieved by the following technical solutions.

A biodegradable self-healing rubber elastomer, prepared by a preparation method comprising: adding enzymatic lignin and itaconic acid separately to lipoic acid, melting and blending separately to obtain a molten blend, and obtaining the rubber elastomer after cooling; wherein a mass ratio of lipoic acid to enzymatic lignin is 10:(2 to 4), and itaconic acid accounts for 20 to 30% of a total mass of lipoic acid and enzymatic lignin.

In the present disclosure, the joint action of enzymatic lignin and itaconic acid can enhance the tensile strength of polylipoic acid, in which the carboxyl group of lipoic acid provides binding sites for a variety of polar functional groups of enzymatic lignin, and greatly improves the tensile strength of the material through hydrogen bonding and the rigid structure of lignin itself, while the aromatic structure contained enhances the aging resistance of the material; the double bond contained in itaconic acid can prevent the depolymerization of polysulfide by inverse vulcanization of the terminal radicals of polysulfide, and the two carboxyl groups contained can also produce hydrogen bonding aggregation with polysulfide and enzymatic lignin to further improve the tensile strength of the material.

When the mass ratio of lipoic acid to enzymatic lignin is 10:(2-4), the material has high tensile strength and elongation at break, and the tensile strength of the material gradually increases with the increase of the amount of enzymatic lignin added, due to the hydrogen bonding aggregation of functional groups in enzymatic lignin. However, with the increase of enzymatic lignin incorporation, the proportion of rigid structure increases subsequently, and the brittleness and hardness of the material increases, and the elasticity and strain decreases.

When itaconic acid accounts for 20-30% of the total mass of lipoic acid and enzymatic lignin, the material has high tensile strength and elasticity. The reason is that when the amount of itaconic acid added is less than 20%, the effect of itaconic acid to prevent the depolymerization of polylipoic acid is poor, and the hydrogen bonding formed by itaconic acid and polylipoic acid is weak, and the enhancement of tensile strength is not obvious; while when the amount of itaconic acid added is more than 30%, too much hydrogen bonding causes the material network to be too tight, and the elongation at break of the material is reduced.

In some embodiments, enzymatic lignin is added to lipoic acid before itaconic acid is added. Enzymatic lignin is added first to react with lipoic acid, so that the enzymatic lignin combines more fully with the active site of lipoic acid and the material has higher strength and better elasticity.

In some embodiments, the method further includes: adding metal ions to the molten blend, melting and blending again, and obtaining the rubber elastomer after cooling; wherein a mass ratio of the metal ions to the molten blend is 1:(200 to 800).

The addition of metal ions is then able to form coordination bonds with the carboxyl groups of polylipoic acid, enzymatic lignin, and itaconic acid, which further enhances the bonding of the network structure and further increases the tensile strength, and when the mass ratio of metal ions to the molten blend is 1:(200 to 800), it is able to form good coordination crosslinks with the network to achieve the tensile strength and elongation at break of the material. When the metal ions are added too little, such as when the ratio of added metal ions is 1:1000, the crosslink formed with the network is not enough, and the enhancement of the material tensile strength and elongation at break is not ideal; while when the metal ions are added too much, such as when the ratio of added metal ions is more than 1:100, the tensile strength decreases instead, because the coordination sacrificial bond can dissipate energy in the tensile process, which improves the composite elongation at break, while leading to more stress dissipation.

In some embodiments, the metal ions are $Zn^{2+}$. The addition of $Zn^{2+}$ is able to form a good coordination bond with the carboxyl groups of polylipoic acid, enzymatic lignin, and itaconic acid.

In some embodiments, the mass ratio of the metal ions to the molten blend is 1:(400 to 600). At this mass ratio, the metal ions form a better cross-link with the network, which is more effective in enhancing the tensile strength of the material, while giving the material a higher elasticity.

In some embodiments, a temperature of the melting and blending is 130 to 140° C. At this temperature, the material is more fluid during stirring, the reaction is more adequate, the components are better dispersed in the network structure, and the final material produced has better properties.

In some embodiments, a duration of the melting and blending after enzymatic lignin is added is 15 to 20 min.

In some embodiments, a duration of the melting and blending after itaconic acid is added is 15 to 20 min.

In some embodiments, a duration of the melting and blending after metal irons are added is 2 to 5 min.

Under the duration of the melting and blending, the components can fully react with each other to form stable hydrogen, disulfide, and coordination bonds, so that the material has higher tensile strength, elongation at break, and self-repair properties.

The present disclosure further provides a method for preparing the above-mentioned biodegradable self-repairing rubber elastomer.

The biodegradable self-repairing rubber elastomer of the present disclosure can be used as a substitute for conventional synthetic rubber products such as styrene-butadiene rubber (tensile strength 2-4 MPa, elongation at break 300%-800%) because of its high tensile strength and elongation at break.

The present disclosure has the following beneficial effects:
(1) The present disclosure provides a novel biodegradable self-healing rubber elastomer, which is prepared by using the melting method, adding enzymatic lignin and itaconic acid to polylipoic acid separately, and a variety of polar functional groups of enzymatic lignin combine with polylipoic acid through hydrogen bonding to build a rigid and flexible structural network; itaconic acid can prevent the depolymerization of poly(thioctanoic acid) and improve the tensile strength by inverse vulcanization of the terminal radicals of poly(TA), thus enhancing the network through covalent cross-linking; the resulting rubber elastomer not only has excellent tensile strength but also high elasticity, and the tensile strength and elongation at break reach or exceed those of traditional synthetic rubber such as SBR. In addition, the disulfide and hydrogen bonds in the biodegradable self-repairing rubber elastomer can give the material self-repairing properties, and the final rubber elastomer is also recyclable, anti-aging, self-repairing, etc.; the material has a long service life and little environmental pollution, green and safe degradable, which can replace the use of traditional synthetic rubber.
(2) The present disclosure further adds metal ions to the rubber elastomer, so that the metal ions form coordination bonds with the carboxyl groups in the rubber elastomer to further enhance the network structure, and the coordination bonds can also give the material self-healing properties. The amount of enzymatic lignin, itaconic acid, and metal ions can further regulate the performance of the rubber elastomer.
(3) The raw materials used in the present disclosure are green and degradable, and the materials can be recycled to reduce the waste of resources and environmental pollution; its preparation method adopts solvent-free preparation, which reduces chemical pollution and is environmentally friendly, and the preparation process is simple and easy to realize industrialization.

DETAILED DESCRIPTION

The following will be a clear and complete description of the technical solution of the present disclosure in conjunction with specific embodiments of the present disclosure. Obviously, the described embodiments are only a part of the embodiments of the present disclosure, and not all of them. Based on the embodiments in the present disclosure, other embodiments obtained by those skilled in the art without making any creative labor belong to the scope of the present disclosure.

Embodiment 1

Figure 1:
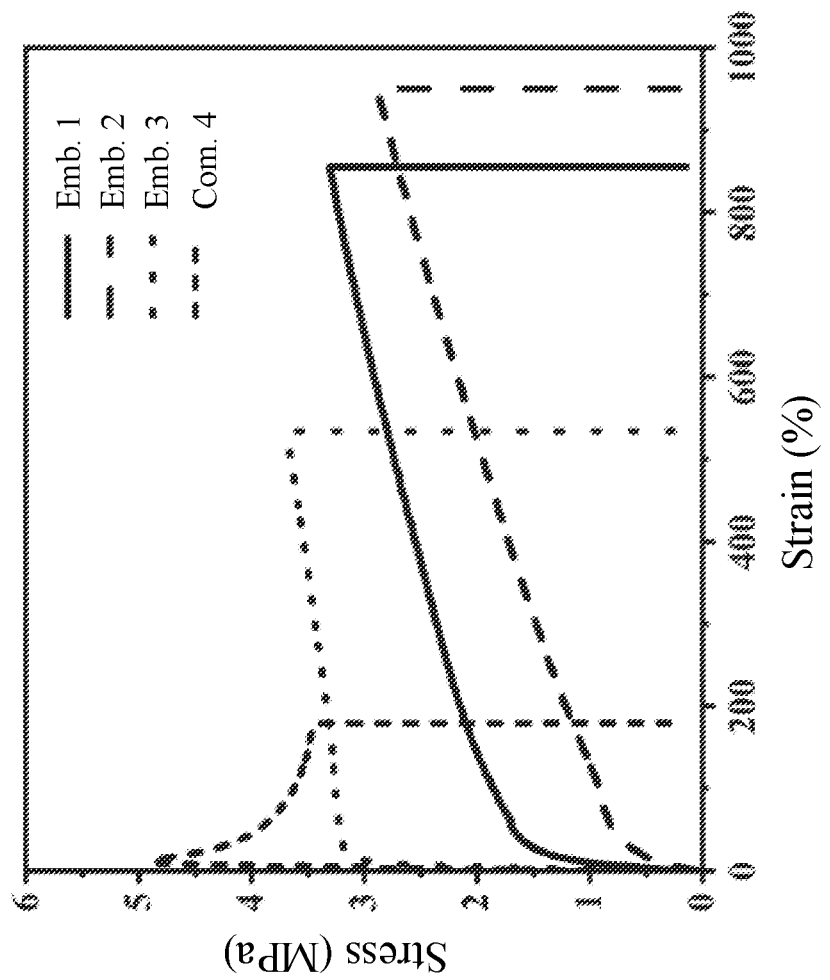
FIG. 1 shows stress-strain curves of biodegradable self-healing rubber elastomers prepared by varying the amount of enzymatic lignin addition in Embodiments 1 to 3 and Comparative Examples 3 to 4.

A method for preparing a biodegradable self-healing rubber elastomer, as shown in FIG. 1, including the following operations.

Weighing 1.5 g of lipoic acid and 0.45 g of enzymatic lignin (a mass ratio of lipoic acid to enzymatic lignin is 10:3) into a clean small reaction flask, covering the reaction flask, turning on a heating device, setting a heating temperature to 135° C., heating for about 20 min (so that lipoic acid is completely molten), turning on a stirring device, setting a rotational speed to 500 rpm, and mixing thoroughly for 20 min; slowly adding 0.49 g of itaconic acid (25% of a total mass of lipoic acid and enzymatic lignin), keeping a reaction temperature unchanged, increasing the rotational speed to 550 rpm, fully reacting for 20 min to obtain molten blends, pouring the molten blends into a mold for cooling and molding, and obtaining the rubber elastomer.

Embodiment 2

The rest of the method for preparing biodegradable self-healing rubber elastomer in this embodiment is the same as that in Embodiment 1, with the difference that the amount of enzymatic lignin added is 0.3 g (the mass ratio of lipoic acid to enzymatic lignin is 10:2) and the amount of itaconic acid added is 0.45 g (25% of the total mass of lipoic acid and enzymatic lignin).

Embodiment 3

The rest of the method for preparing biodegradable self-healing rubber elastomer in this embodiment is the same as that in Embodiment 1, with the difference that the amount of enzymatic lignin added is 0.6 g (the mass ratio of lipoic acid to enzymatic lignin is 10:4) and the amount of itaconic acid added is 0.45 g (25% of the total mass of lipoic acid and enzymatic lignin).

Embodiment 4

The rest of the method for preparing biodegradable self-healing rubber elastomer in this embodiment is the same as that in Embodiment 1, with the difference that the amount of itaconic acid added is 0.39 g (20% of the total mass of lipoic acid and enzymatic lignin).

Embodiment 5

The rest of the method for preparing biodegradable self-healing rubber elastomer in this embodiment is the same as that in Embodiment 1, with the difference that the amount of itaconic acid added is 0.59 g (30% of the total mass of lipoic acid and enzymatic lignin).

Embodiment 6

Figure 2:
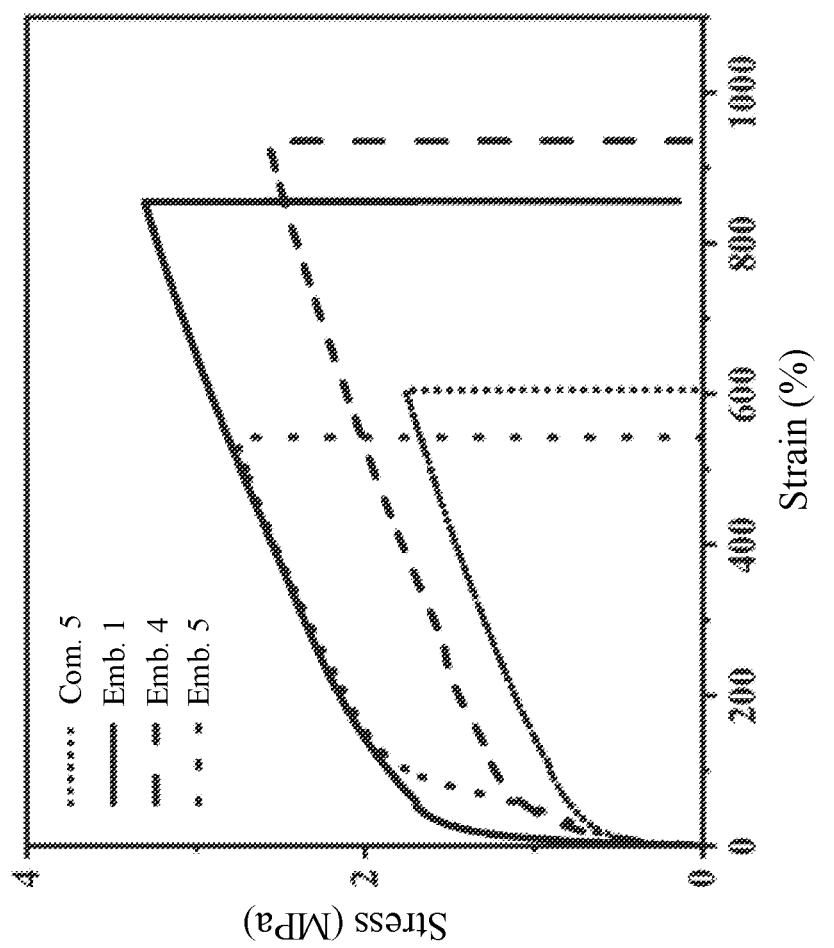
FIG. 2 shows stress-strain curves of biodegradable self-healing rubber elastomers prepared by varying the amount of itaconic acid addition in Embodiments 1, 4 to 5, and Comparative Example 5.

The rest of the method of preparing biodegradable self-healing rubber elastomer in this embodiment is the same as that of Embodiment 1, with the difference that, as shown in FIG. 2: adding diluted 500 μL of 0.05 g/mL $ZnCl_2$ aqueous solution (a mass ratio of $Zn^{2+}$ to the molten blends is 1:200) drop by drop to the molten blends, keeping the reaction temperature constant, and fully reacting for 2-5 min, then pouring the molten blends into the mold for cooling and molding to obtain the rubber elastomer.

Embodiment 7

The rest of the method for preparing biodegradable self-healing rubber elastomers in this Embodiment is the same as in Embodiment 6, with the difference that the $ZnCl_2$ aqueous solution is added in a volume of 250 μL (the mass ratio of $Zn^{2+}$ to the molten blends is 1:400).

Embodiment 8

The rest of the method for preparing biodegradable self-healing rubber elastomers in this embodiment is the same as in Embodiment 6, with the difference that the $ZnCl_2$ aqueous solution is added in a volume of 167 μL (the mass ratio of $Zn^{2+}$ to the molten blends is 1:600).

Embodiment 9

The rest of the method for preparing biodegradable self-healing rubber elastomers in this embodiment is the same as in Embodiment 6, with the difference that the $ZnCl_2$ aqueous solution is added in a volume of 125 μL (the mass ratio of $Zn^{2+}$ to the molten blends is 1:800).

Embodiment 10

A method of preparing a biodegradable self-healing rubber elastomer, including the following operations.

Weighing 1.5 g of lipoic acid and 0.49 g of itaconic acid (25% of a total mass of lipoic acid and enzymatic lignin) into a clean small reaction flask, covering the reaction flask, turning on a heating device, setting a heating temperature to 135° C., heating at 135° C. for about 20 minutes, turning on a stirring device, setting a rotational speed to 500 rpm, and mixing thoroughly for 20 min; slowly adding 0.45 g of enzymatic lignin (a mass ratio of lipoic acid to enzymatic lignin is 10:3), keeping a reaction temperature unchanged, increasing the rotational speed to 550 rpm, fully reacting for 20 min to obtain molten blends, pouring the molten blends into a mold for cooling and molding, and obtaining a poly(lipoic acid)-enzymatic lignin elastomer.

(The main difference from Embodiment 1 is that itaconic acid is added first, followed by enzymatic lignin)

Comparative Example 1

The rest of the method for preparing biodegradable self-healing rubber elastomer in this example is the same as that in Embodiment 1, with the difference that the amount of enzymatic lignin added is 0.45 g (the mass ratio of lipoic acid to enzymatic lignin is 10:3), and no itaconic acid is added.

Comparative Example 2

The rest of the method for preparing biodegradable self-healing rubber elastomer in this example is the same as Embodiment 1, with the difference that: no enzymatic lignin is added and the amount of itaconic acid added is 0.375 g (25% of lipoic acid).

Comparative Example 3

The rest of the method for preparing biodegradable self-healing rubber elastomer in this example is the same as that in Embodiment 1, with the difference that the amount of enzymatic lignin added is 0.15 g (the mass ratio of lipoic acid to enzymatic lignin is 10:1) and the amount of itaconic acid added is 0.41 g (25% of the total mass of lipoic acid and enzymatic lignin).

Comparative Example 4

The rest of the method for preparing biodegradable self-healing rubber elastomer in this example is the same as that in Embodiment 1, with the difference that the amount of enzymatic lignin added is 0.75 g (the mass ratio of lipoic acid to enzymatic lignin is 10:5) and the amount of itaconic acid added is 0.57 g (25% of the total mass of lipoic acid and enzymatic lignin).

Comparative Example 5

The rest of the method for preparing biodegradable self-healing rubber elastomer in this example is the same as step S1 in Embodiment 1, with the difference that the amount of itaconic acid added is 0.29 g (15% of the total mass of lipoic acid and enzymatic lignin).

Comparative Example 6

The rest of the method for preparing biodegradable self-healing rubber elastomers in this example is the same as in Embodiment 5, with the difference that the $ZnCl_2$ aqueous solution is added in a volume of 1000 μL (the mass ratio of $Zn^{2+}$ to the molten blends is 1:100).

Performance Test

The biodegradable self-healing rubber elastomers made by the embodiments and the comparative examples are tested in tension to obtain stress-strain curves and elongation at break; and tested for aging resistance.

Results and Analysis

TABLE 1

Test data for embodiments and comparative examples

| | lipoic acid: enzymatic lignin (mass ratio) | itaconic acid (percentage of total mass of lipoic acid and enzymatic lignin) | $Zn^{2+}$: molten blends (mass ratio) | Tensile strength | Elongation at break |
|---|---|---|---|---|---|
| Embodiment 1 | 10:3 | 25 | 0 | 3.3 | 855 |
| Embodiment 2 | 10:2 | 25 | 0 | 2.88 | 951 |
| Embodiment 3 | 10:4 | 25 | 0 | 3.69 | 540 |
| Embodiment 4 | 10:3 | 20 | 0 | 2.57 | 900 |
| Embodiment 5 | 10:3 | 30 | 0 | 2.76 | 542 |
| Embodiment 6 | 10:3 | 25 | 1:200 | 4.27 | 910 |
| Embodiment 7 | 10:3 | 25 | 1:400 | 4.73 | 900 |
| Embodiment 8 | 10:3 | 25 | 1:600 | 4.40 | 987 |
| Embodiment 9 | 10:3 | 25 | 1:800 | 4.17 | 949 |
| Embodiment 10 | 10:3 | 25 | 0 | 2.30 | 605 |
| Comparative Example 1 | 10:3 | 0 | 0 | Material unshaped | |
| Comparative Example 2 | 0 | 25 | 0 | 0.03 | 585 |
| Comparative Example 3 | 10:1 | 25 | 0 | 1.81 | 556 |
| Comparative Example 4 | 10:5 | 25 | 0 | 4.88 | 180 |
| Comparative Example 5 | 10:3 | 15 | 0 | 1.75 | 600 |
| Comparative Example 6 | 10:3 | 25 | 1:100 | 1.16 | 1400 |

As can be seen from Embodiments 1 to 3 and the Comparative Examples 3 to 4 and FIG. 1, the rubber elastomer has high tensile strength and elongation at break when the mass ratio of lipoic acid to enzymatic lignin is 10:(2 to 4); while the elastomer tensile strength and elongation at break decrease when this mass ratio is 10:1; when the mass ratio is 10:5, the elongation at break of the material decreases substantially with the increase of lignin content, while the tensile strength increases.

As can be seen from Embodiments 1, 4 to 5 and Comparative Example 5 and FIG. 2, the rubber elastomer has high tensile strength and elongation at break when the amount of itaconic acid added is 20-30% of the total mass of lipoic acid and enzymatic lignin; while at this mass fraction of 15%, it is not obvious to improve the performance of the material because the mass of itaconic acid is too little; when the mass fraction of itaconic acid is 30%, too much hydrogen bonding aggregates, which may cause uneven network distribution, low tensile strength, and reduced elongation at break of elastomer.

Figure 3:
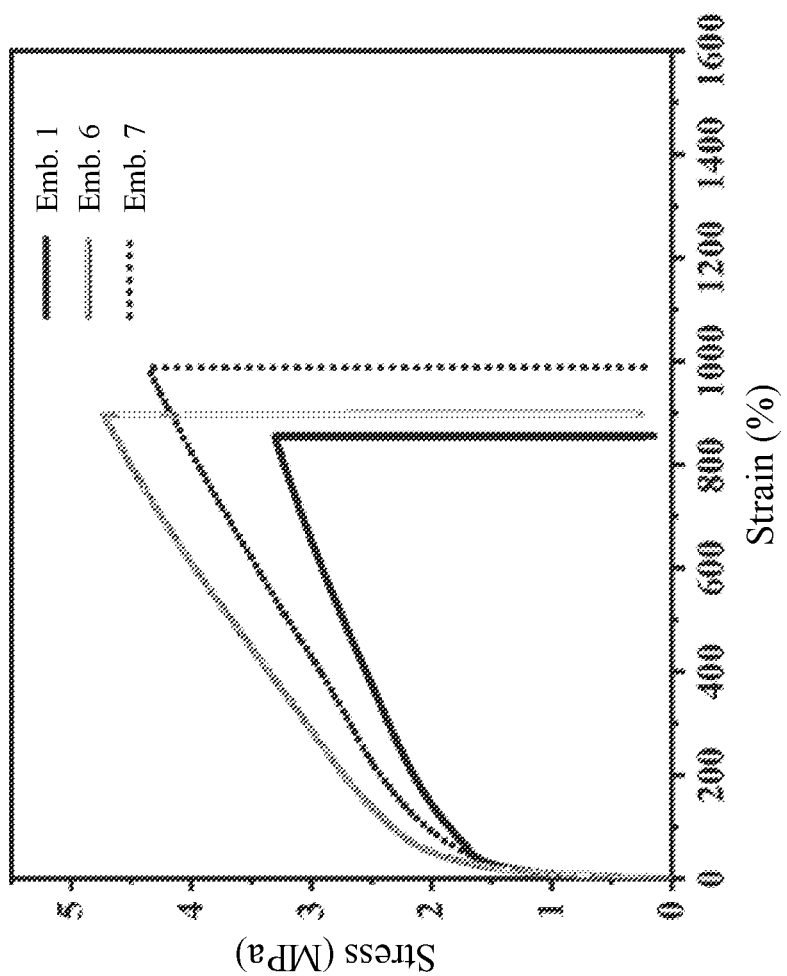
FIG. 3 shows stress-strain curves of biodegradable self-healing rubber elastomers prepared by varying the amount of $Zn^{2+}$ addition in Embodiments 1, 6 to 10, and Comparative Example 6.

As can be seen from Embodiments 6 to 9, Comparative Example 6, and FIG. 3, the tensile strength and elongation at break of the poly(lipoic acid)-lignin elastomer increase to a greater extent than the material without ions at a mass ratio of 1:(200 to 800) of $Zn^{2+}$ to the molten blends, and the tensile strength is higher at this mass ratio of 1:(400 to 600).

Figure 4:
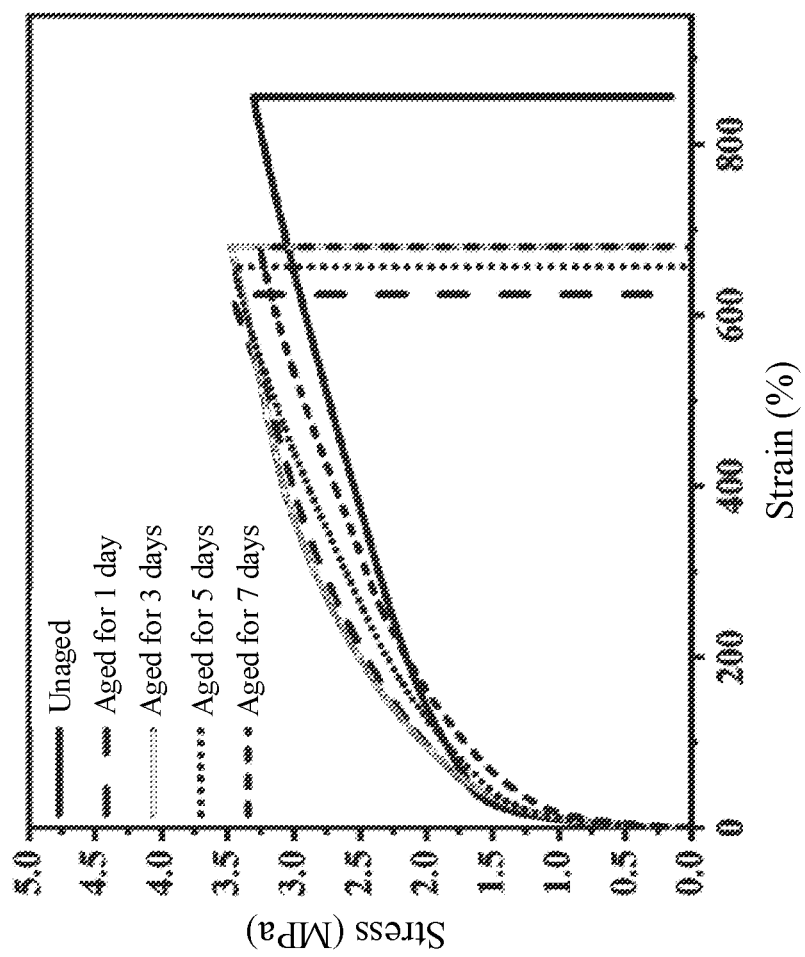
FIG. 4 shows stress-strain curves of biodegradable self-healing rubber elastomers prepared in Embodiment 1 after aging for different time.

As can be seen from FIG. 4, the rubber elastomer made by the present disclosure has good anti-aging properties, and the tensile strength remains basically unchanged after 7 days of aging.

Figure 5:
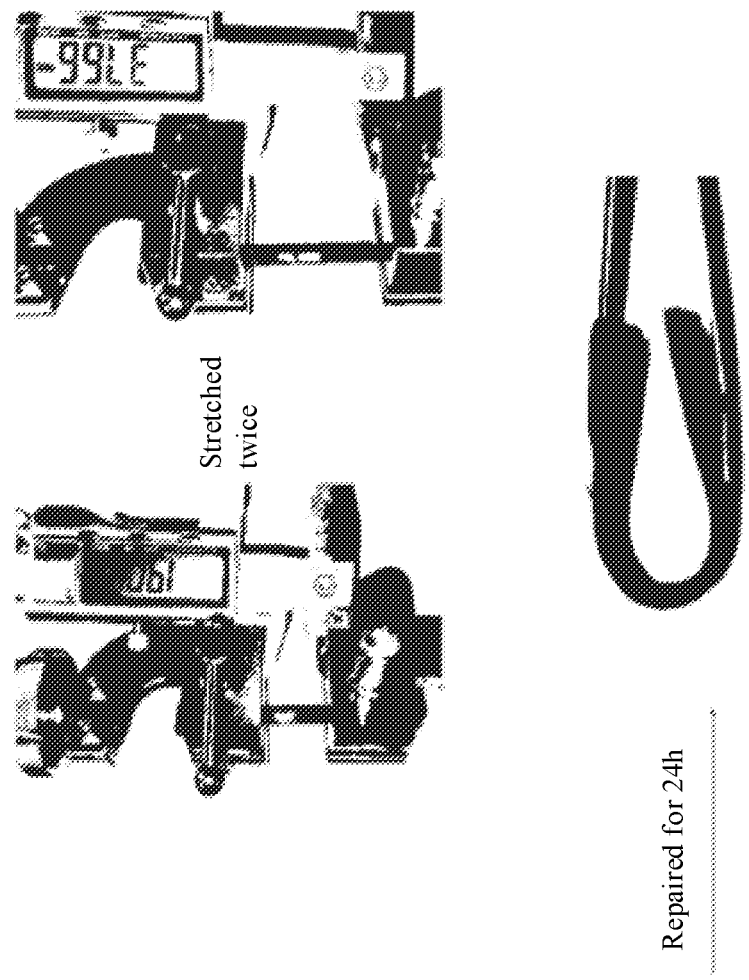
FIG. 5 shows a self-healing diagram of biodegradable self-healing rubber elastomers prepared in Embodiment 1.
Figure 5:
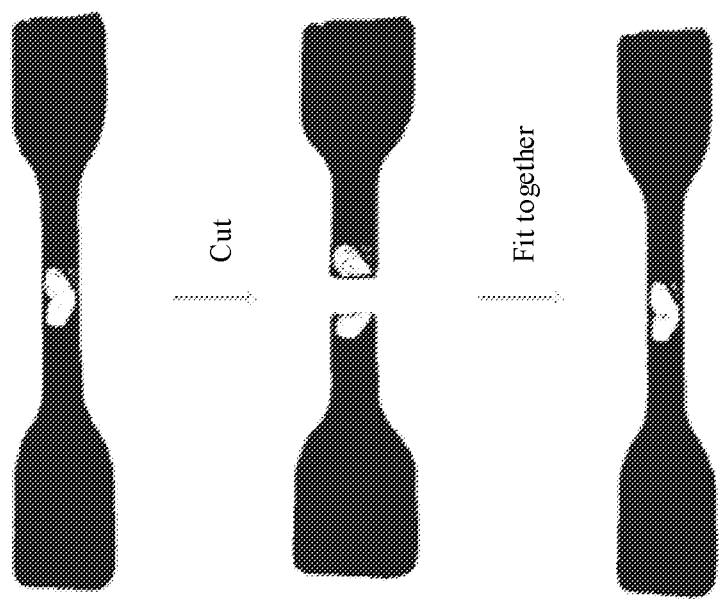

As can be seen from FIG. 5, the rubber elastomer prepared in Embodiment 1 is cut off and then put together, and the rubber elastomer achieves self-healing after 24 hours, and the repaired rubber elastomer can be stretched twice in length and does not break.

Obviously, the above embodiments of the present disclosure are merely examples for the purpose of clearly illustrating the present disclosure, and are not intended to limit the manner in which the present disclosure can be implemented. For those skilled in the art, other variations or changes may be made in different forms on the basis of the above description. It is not necessary or possible to list all embodiments here. Any modifications, equivalent substitutions, and improvements made within the spirit and principles of the present disclosure shall be included in the scope of the claims of the present disclosure.

What is claimed is:

1. A biodegradable self-healing rubber elastomer, prepared by a preparation method A or a preparation method B;
   wherein the preparation method A comprises: adding enzymatic lignin to lipoic acid, melting and blending to obtain a molten blend, adding itaconic acid to the molten blend and melting and blending, and obtaining the rubber elastomer after cooling; wherein a mass ratio of lipoic acid to enzymatic lignin is 10:(2 to 4), and itaconic acid accounts for 20 to 30% of a total mass of lipoic acid and enzymatic lignin;
   wherein the preparation method B comprises: adding enzymatic lignin to lipoic acid, melting and blending to obtain a molten blend, adding itaconic acid to the molten blend and melting and blending, adding metal ions to the molten blend, melting and blending again, and obtaining the rubber elastomer after cooling; wherein a mass ratio of lipoic acid to enzymatic lignin is 10:(2 to 4), itaconic acid accounts for 20 to 30% of a total mass of lipoic acid and enzymatic lignin, and a mass ratio of the metal ions to the molten blend is 1:(200 to 800).

2. The biodegradable self-healing rubber elastomer according to claim 1, wherein the metal ions are $Zn^{2+}$.

3. The biodegradable self-healing rubber elastomer according to claim 1, wherein the mass ratio of the metal ions to the molten blend is 1:(400 to 600).

4. The biodegradable self-healing rubber elastomer according to claim 1, wherein a temperature of the melting and blending is 130 to 140° C.

5. The biodegradable self-healing rubber elastomer according to claim 1, wherein a duration of the melting and blending after enzymatic lignin is added is 15 to 20 min.

6. The biodegradable self-healing rubber elastomer according to claim 1, wherein a duration of the melting and blending after itaconic acid is added is 15 to 20 min.

7. The biodegradable self-healing rubber elastomer according to claim 1, wherein a duration of the melting and blending after metal irons are added is 2 to 5 min.

* * * * *